(12) United States Patent
Chen et al.

(10) Patent No.: US 11,342,601 B2
(45) Date of Patent: May 24, 2022

(54) THERMAL RUNAWAY DETECTION METHOD AND BATTERY MANAGEMENT SYSTEM

(71) Applicant: CONTEMPORARY AMPEREX TECHNOLOGY CO., LIMITED, Fujian (CN)

(72) Inventors: Xiaobo Chen, Fujian (CN); Yao Li, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 0 days.

(21) Appl. No.: 15/734,718

(22) PCT Filed: Jul. 10, 2020

(86) PCT No.: PCT/CN2020/101448
§ 371 (c)(1),
(2) Date: Dec. 3, 2020

(87) PCT Pub. No.: WO2022/006902
PCT Pub. Date: Jan. 13, 2022

(65) Prior Publication Data
US 2022/0013818 A1    Jan. 13, 2022

(51) Int. Cl.
*H01M 10/48*    (2006.01)
*H01M 10/625*   (2014.01)
*H01M 10/633*   (2014.01)
*H01M 10/613*   (2014.01)

(52) U.S. Cl.
CPC ....... *H01M 10/486* (2013.01); *H01M 10/488* (2013.01); *H01M 10/613* (2015.04); *H01M 10/625* (2015.04); *H01M 10/633* (2015.04); *H01M 2220/20* (2013.01)

(58) Field of Classification Search
CPC ............. H01M 10/486; H01M 10/488; H01M 10/613; H01M 10/625; H01M 10/633
See application file for complete search history.

(56) References Cited

U.S. PATENT DOCUMENTS

| 2004/0257089 A1 | 12/2004 | Aridome |
| 2010/0136391 A1 | 6/2010 | Prilutsky et al. |
| 2013/0095356 A1* | 4/2013 | Shimizu ............ H01M 50/3425 429/88 |

(Continued)

FOREIGN PATENT DOCUMENTS

| CN | 102496747 A | 6/2012 |
| CN | 106252753 A | 12/2016 |
| CN | 107732339 A | 2/2018 |

(Continued)

*Primary Examiner* — Karie O'Neill Apicella
(74) *Attorney, Agent, or Firm* — Scully Scott Murphy & Presser

(57) ABSTRACT

The present application provides a thermal runaway detection method and a battery management system, which can effectively detect occurrence of thermal runaway of a battery. The method includes: acquiring at least one parameter of a cooling medium of a battery, the battery including a heat conducting apparatus, and the cooling medium being contained in the heat conducting apparatus; and determining, when the at least one parameter satisfies a preset condition, that thermal runaway occurs in the battery.

20 Claims, 7 Drawing Sheets

(56) References Cited

U.S. PATENT DOCUMENTS

2015/0171486 A1     6/2015  Rawlinson
2019/0077276 A1*    3/2019  Capati ................ H05K 7/20872

FOREIGN PATENT DOCUMENTS

| CN | 109546234 A | 3/2019 |
| CN | 109799005 A | 5/2019 |
| EP | 2887446 A1 | 6/2015 |
| EP | 3840103 A1 | 6/2021 |

* cited by examiner

THERMAL RUNAWAY DETECTION METHOD AND BATTERY MANAGEMENT SYSTEM

CROSS-REFERENCE TO RELATED APPLICATIONS

This application is a national stage of International Application No. PCT/CN2020/101448, filed on Jul. 10, 2020, which is hereby incorporated by reference in its entirety.

TECHNICAL FIELD

Embodiments of the present application relate to the field of battery technologies, and more specifically, to a thermal runaway detection method and a battery management system.

BACKGROUND

Energy saving and emission reduction are the key to the sustainable development of the automotive industry. In this case, electric vehicles have become an important part of the sustainable development of the automotive industry due to advantages of energy saving and environmental-friendliness. For the electric vehicles, the battery technology is an important factor for their development.

In the development of the battery technology, in addition to improving the performance of batteries, safety is also an issue that cannot be ignored. When a thermal runaway and other events that endanger safety occur in a battery, it is necessary to detect occurrence of thermal runaway in time to alert passengers to avoid dangerous situations. Therefore, how to effectively detect the thermal runaway of the battery has become an urgent technical problem to be solved in the battery technology.

SUMMARY

Embodiments of the present application provide a thermal runaway detection method and a battery management system, which can effectively detect the thermal runaway of a battery.

According to a first aspect, provided is a thermal runaway detection method, including: acquiring at least one parameter of a cooling medium of a battery, the battery including a heat conducting apparatus, and the cooling medium being contained in the heat conducting apparatus; and determining, when the at least one parameter satisfies a preset condition, that thermal runaway occurs in the battery.

In this embodiment, when thermal runaway occurs in the battery, this may cause the heat conducting apparatus in the battery to be damaged, and thus causes the parameters of the cooling medium contained in the heat conducting apparatus to change. Therefore, the thermal runaway of the battery may be effectively detected according to the parameters of the cooling medium.

In a possible implementation manner, the at least one parameter includes at least one of the following parameters: pressure of the cooling medium, a flow rate of the cooling medium, a liquid level of the cooling medium, and temperature of the cooling medium.

Because the changes in the several parameters including the pressure, the flow rate, the liquid level, and the temperature of the cooling medium are most sensitive to the heat conducting apparatus being damaged, the several parameters can be used to accurately detect the thermal runaway of the battery.

In a possible implementation manner, the at least one parameter satisfying a preset condition includes: the at least one parameter satisfying any one of the following preset conditions: a parameter value reaching a corresponding threshold; a change amount of the parameter value reaching a corresponding threshold; and the parameter value being lost.

In this embodiment, a parameter value reaching a certain threshold, a change amount of the parameter value reaching a certain threshold, or the parameter value being lost because a sensor is damaged may be used as a condition for determining occurrence of thermal runaway. In practical applications, based on the change rule, the change speed, etc. of different parameters, suitable conditions can be used to determine whether thermal runaway occurs in the battery.

In a possible implementation manner, the at least one parameter includes the pressure of the cooling medium, wherein the pressure of the cooling medium satisfying a preset condition includes: the pressure of the cooling medium dropping to a first pressure threshold; a change amount of the pressure of the cooling medium exceeding a second pressure threshold; or data of the pressure of the cooling medium being lost.

In a possible implementation manner, the method further includes: acquiring the pressure of the cooling medium from a pressure sensor, wherein the pressure sensor is disposed on an input port or an output port of the heat conducting apparatus, and the pressure sensor is configured to monitor the pressure of the cooling medium.

The input port and the output port of the heat conducting apparatus is configured to input and output the cooling medium, and the pressure sensor is disposed on the input port or the output port of the heat conducting apparatus, which ensures the convenience of an installation position, and also makes it easier to monitor the change in the pressure of the cooling medium.

In a possible implementation manner, the at least one parameter includes the flow rate of the cooling medium, wherein the flow rate of the cooling medium satisfying a preset condition includes: the flow rate of the cooling medium dropping to a first flow threshold; a change amount of the flow rate of the cooling medium exceeding a second flow threshold; or data of the flow rate of the cooling medium being lost.

In a possible implementation manner, the method further includes: acquiring the flow rate of the cooling medium from a flow rate sensor, wherein the flow rate sensor is disposed on an input port or an output port of the heat conducting apparatus, and the flow rate sensor is configured to monitor the flow rate of the cooling medium.

The flow rate sensor is disposed on the input port or the output port of the heat conducting apparatus, which ensures the convenience of an installation position, and also makes it easier to monitor the change in the flow rate of the cooling medium.

In a possible implementation manner, the at least one parameter includes the liquid level of the cooling medium, wherein the liquid level of the cooling medium satisfying a preset condition includes: the liquid level of the cooling medium dropping to a first level threshold; a change amount of the liquid level of the cooling medium exceeding a second level threshold; or data of the liquid level of the cooling medium being lost.

In a possible implementation manner, the method further includes: acquiring the liquid level of the cooling medium from a liquid level sensor, wherein the liquid level sensor is disposed on a storage box configured to store the cooling medium, and the liquid level sensor is configured to monitor the liquid level of the cooling medium stored in the storage box.

The cooling medium is stored in the storage box, and the storage box communicates with the input port of the heat conducting apparatus. The change in the liquid level in the storage box is most sensitive to the case where the cooling medium in the heat conducting apparatus is discharged from the inside of the heat conducting apparatus because thermal runaway occurs in the battery, and thus the liquid level sensor is disposed on the storage box, so that the change in the liquid level of the cooling medium can be more accurately monitored.

In a possible implementation manner, the at least one parameter includes the temperature of the cooling medium, wherein the temperature of the cooling medium satisfying a preset condition includes: the temperature of the cooling medium rising to a first temperature threshold; a change amount of the temperature of the cooling medium exceeding a second temperature threshold; or data of the temperature of the cooling medium being lost.

In a possible implementation manner, the method further includes: acquiring the temperature of the cooling medium from a temperature sensor, wherein the temperature sensor is disposed on an output port of the heat conducting apparatus, and the temperature sensor is configured to monitor the temperature of the cooling medium at the output port of the heat conducting apparatus.

In a possible implementation manner, the method further includes: outputting, to a vehicle control unit, an indication signal for indicating that thermal runaway occurs in the battery.

According to a second aspect, provided is a battery management system, including:

an acquisition unit configured to acquire at least one parameter of a cooling medium of a battery, the battery including a heat conducting apparatus, and the cooling medium being contained in the heat conducting apparatus; and a processing unit configured to determine, when the at least one parameter satisfies a preset condition, that thermal runaway occurs in the battery.

In a possible implementation manner, the at least one parameter acquired by the acquisition unit includes at least one of the following parameters: pressure of the cooling medium, a flow rate of the cooling medium, a liquid level of the cooling medium, and temperature of the cooling medium.

In a possible implementation manner, the at least one parameter satisfying a preset condition includes: the at least one parameter satisfying any one of the following preset conditions: a parameter value reaching a corresponding threshold; a change amount of the parameter value reaching a corresponding threshold; and the parameter value being lost.

In a possible implementation manner, the at least one parameter includes the pressure of the cooling medium, wherein the processing unit is specifically configured to: determine, when the pressure of the cooling medium drops to a first pressure threshold, a change amount of the pressure of the cooling medium exceeds a second pressure threshold, or data of the pressure of the cooling medium is lost, that thermal runaway occurs in the battery.

In a possible implementation manner, the processing unit is further configured to: acquire the pressure of the cooling medium from a pressure sensor, wherein the pressure sensor is disposed on an input port or an output port of the heat conducting apparatus, and the pressure sensor is configured to monitor the pressure of the cooling medium.

In a possible implementation manner, the at least one parameter includes the flow rate of the cooling medium, wherein the processing unit is specifically configured to: determine, when the flow rate of the cooling medium drops to a first flow threshold, a change amount of the flow rate of the cooling medium exceeds a second flow threshold, or data of the flow rate of the cooling medium is lost, that thermal runaway occurs in the battery.

In a possible implementation manner, the processing unit is further configured to: acquire the flow rate of the cooling medium from a flow rate sensor, wherein the flow rate sensor is disposed on an input port or an output port of the heat conducting apparatus, and the flow rate sensor is configured to monitor the flow rate of the cooling medium.

In a possible implementation manner, the at least one parameter includes the liquid level of the cooling medium, wherein the processing unit is specifically configured to: determine, when the liquid level of the cooling medium drops to a first level threshold, a change amount of the liquid level of the cooling medium exceeds a second level threshold, or data of the liquid level of the cooling medium is lost, that thermal runaway occurs in the battery.

In a possible implementation manner, the processing unit is further configured to: acquire the liquid level of the cooling medium from a liquid level sensor, wherein the liquid level sensor is disposed on a storage box configured to store the cooling medium, and the liquid level sensor is configured to monitor the liquid level of the cooling medium stored in the storage box.

In a possible implementation manner, the at least one parameter includes the temperature of the cooling medium, wherein the processing unit is specifically configured to: determine, when the temperature of the cooling medium rises to a first temperature threshold, a change amount of the temperature of the cooling medium exceeds a second temperature threshold, or data of the temperature of the cooling medium is lost, that thermal runaway occurs in the battery.

In a possible implementation manner, the processing unit is further configured to: acquire the temperature of the cooling medium from a temperature sensor, wherein the temperature sensor is disposed on an output port of the heat conducting apparatus, and the temperature sensor is configured to monitor the temperature of the cooling medium at the output port of the heat conducting apparatus.

In a possible implementation manner, the processing unit is further configured to: output, to a vehicle control unit, an indication signal for indicating that thermal runaway occurs in the battery.

According to a third aspect, a battery is provided, which includes:

at least one battery cell; and the battery management system according to the second aspect and any possible implementation manner of the second aspect described above.

According to a fourth aspect, a thermal runaway detection apparatus is provided, which includes a memory and a processor, wherein the memory is configured to store an instruction, and the processor is configured to read the instruction and perform, based on the instruction, the method according to the first aspect and any possible implementation manner of the first aspect described above.

According to a fifth aspect, a readable storage medium is provided, wherein the readable storage medium is configured to store a computer program used to perform the method according to the first aspect and any possible implementation manner of the first aspect described above.

According to a sixth aspect, provided is a vehicle, including:

the battery according to the third aspect; and a vehicle control system configured to receive an indication signal that is sent by the battery management system in the battery for indicating that thermal runaway occurs in the battery.

In a possible implementation manner, the vehicle control system is further configured to: issue an alarm signal according to the indication signal.

In a possible implementation manner, the alarm signal is an optical signal or a sound signal.

BRIEF DESCRIPTION OF THE DRAWINGS

The accompanying drawings described herein are intended to provide a further understanding of the present application, which constitute a part of the present application. The illustrative embodiments of the present application and the description thereof are for explaining the present application and do not constitute an undue limitation of the present application. In the drawings.

DESCRIPTION OF EMBODIMENTS

The technical solutions in the present application will be described below with reference to the accompanying drawings.

With the development of the battery technology, it is necessary to consider many design factors, such as energy density, cycle life, discharge capacity, charge and discharge rate and other performance parameters. In addition, the safety of the battery should also be considered.

The battery includes a plurality of battery cells, when a thermal runaway such as fire, explosion or fog occurs in one or more of the battery cells, heat is transferred to adjacent battery cells, that is, the thermal runaway of the battery cells may spread to the battery cells around, causing a chain reaction. In the process of heat diffusion, dangerous situations such as fire or explosion may occur at any time.

The thermal diffusion specialized group for the International electric vehicle safety-global technical regulations (EVS-GTR) concluded in the first phase of the study that it requires that for a vehicle with an on-board rechargeable energy storage system (REESS) equipped with flammable electrolytes, the passengers of the vehicle should not be exposed to any dangerous environment caused by thermal diffusion triggered by internal short circuits that can cause thermal runaway of battery cells. To ensure this, some basic requirements need to be satisfied. For example, the vehicle needs to provide a pre-warning indication to allow the passengers to evacuate, or provide a pre-warning indication 5 minutes before the dangerous situations in the occupant compartment are caused by the thermal diffusion triggered by internal short circuits that can cause the thermal runaway of the battery cells. In the newly issued safety requirements for traction batteries for electric vehicles, it is required that an alarm signal should be provided at least five minutes before the thermal diffusion caused by the thermal runaway of the battery cells causes the passenger compartment to become dangerous.

Therefore, the thermal runaway of the battery needs to be effectively detected, and the passengers of the vehicle need to be alerted to avoid dangerous situations in time.

Figure 1:
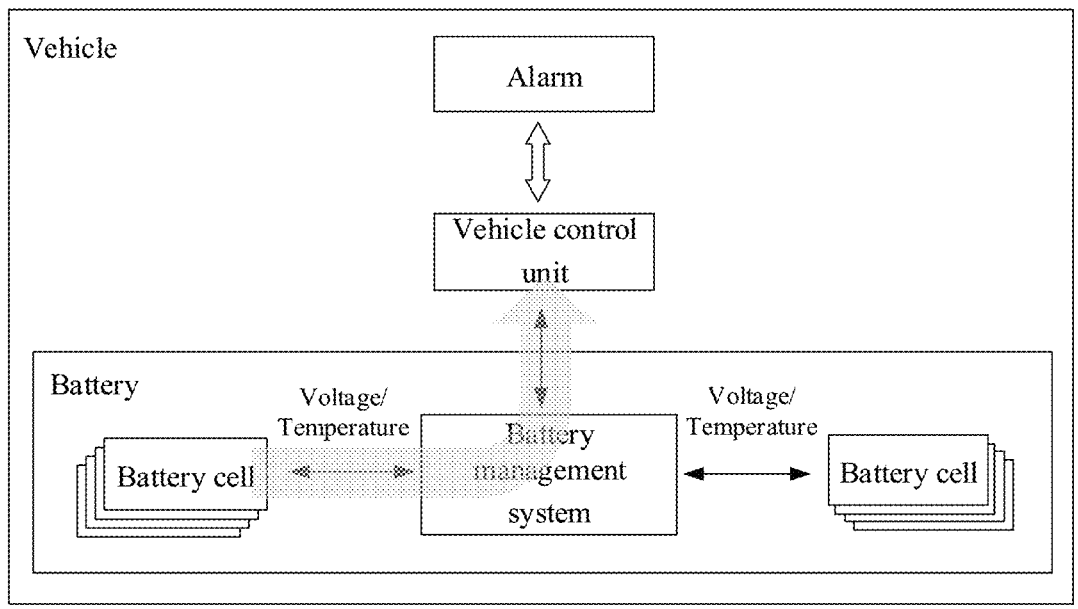
FIG. 1 is a schematic block diagram of monitoring a thermal runaway by a BMS.

In current batteries, the voltage of each battery cell is usually monitored by means of a low-voltage monitoring system, a sensor is provided every few battery cells to monitor the temperature of the battery cell, and a battery temperature change and a voltage change are used to determine whether thermal runaway occurs. As shown in FIG. 1, a battery management system (BMS) is responsible for monitoring the temperature and voltage of a battery cell, and determine whether thermal runaway occurs according to the temperature change and the voltage change. When it is determined that thermal runaway occurs in a battery cell, the BMS may send an indication signal to a vehicle control unit (VCU), and then the VCU issues an alarm signal to alert passengers to avoid dangers.

In the manner shown in FIG. 1, when thermal runaway occurs, there may be the following problems: when characteristics of the voltage drop of a battery cell where thermal runaway occurs coincide with characteristics of the voltage drop of the battery cell during normal discharge, it is difficult to use the characteristics of the voltage drop to determine whether thermal runaway occurs in the battery cell; when it happens that no temperature sensor is arranged on the battery cell where thermal runaway occurs, it is difficult to use a temperature signal to determine whether thermal runaway occurs; and a high-temperature and high-speed gas emitted at the moment when thermal runaway occurs in the battery cell can easily cause physical damage to a voltage sensor and the temperature sensor, and consequently, even if it can be determined whether thermal runaway occurs according to the temperature change and the voltage change of the battery cell, the signal transmission is interrupted due to the damage of the sensors. It can be learned that there are certain missed determinations and erroneous determinations in using the temperature change and the voltage change of the battery to determine whether thermal runaway occurs.

In view of this, the present application proposes a thermal runaway detection method, which can more accurately detect the thermal runaway of a battery, and reduce the probability of missed determinations and erroneous determinations.

The thermal runaway detection method according to an embodiment of the present application may be applied to a battery. A thermal runaway occurring in a battery cell in the battery is also referred to as a thermal runaway occurring in the battery.

The battery includes a heat conducting apparatus, such as a cooling plate or a liquid cooling plate. A cooling medium is contained in the heat conducting apparatus. The cooling medium may be used to cool the battery. It should be understood that when thermal runaway occurs in the battery, the heat conducting apparatus can be damaged, and thus the cooling medium in the heat conducting apparatus is discharged from the inside of the heat conducting apparatus.

Each battery cell in the battery is provided with a pressure relief mechanism, such as an explosion-proof valve. The pressure relief mechanism on the battery cell has an important impact on the safety of the battery. For example, when a short circuit, overcharge, and other phenomena occur, it may cause a thermal runaway inside the battery cell and thus cause a surge of air pressure. In this case, the internal temperature and air pressure can be released outward by the pressure relief mechanism, to prevent the battery cell from exploding and catching fire.

The emissions from battery cells are high-pressure and high-heat emissions, including high-pressure and high-heat gas, liquid, or solid combustion products such as metal scraps. In the current design solution of the pressure relief mechanism, the main concern is to release the high pressure and high heat inside the battery cell, that is, to discharge the emissions to the outside of the battery cell. However, in order to ensure the output voltage or current of the battery, a plurality of battery cells are often required and the plurality of battery cells are electrically connected by means of a bus component. The emissions discharged from the inside of the battery cell may cause a short-circuit phenomenon in the remaining battery cells. For example, when the discharged metal scraps are electrically connected to two bus components, the battery will be short-circuited, thereby posing safety risks.

In view of this, the present application proposes a thermal runaway detection solution, which achieves the purpose of detecting the thermal runaway of the battery through cooperation between the pressure relief mechanism and the heat conducting apparatus. For example, the pressure relief mechanism is provided on a wall of a battery cell, and the surface of the heat conducting apparatus is attached to the same wall of the battery cell. The pressure relief mechanism is configured to release the internal pressure when the internal pressure of the battery cell reaches a threshold, so that the surface of the heat conducting apparatus is damaged.

When the heat conducting apparatus is damaged due to the thermal runaway of the battery cell, the cooling medium in the heat conducting apparatus is discharged from the inside of the heat conducting apparatus. By monitoring the cooling medium, it can be determined whether thermal runaway occurs.

Further, the pressure relief mechanism is used, such that the emissions discharged from the inside of the battery cell can damage the heat conducting apparatus and thus the cooling medium inside the heat conducting apparatus is discharged. The emissions can be cooled to further reduce the danger from the emissions.

In addition, in the embodiments of the present application, the pressure relief mechanism of the battery cell and the electrode terminals of the battery cell are provided on different walls of the battery cell, such that the emissions can be farther away from the electrode terminals, thereby reducing the impact of the emissions on the electrode terminals and the bus component, and enhancing the safety of the battery.

The technical solutions described in the embodiments of the present application are applicable to various apparatuses that use batteries, such as electric vehicles, ships, and spacecrafts. For example, the spacecrafts include airplanes, rockets, space shuttles, spaceships, etc.

It should be understood that the technical solutions described in the embodiments of the present application are not only applicable to the devices described above, but also applicable to all devices that use batteries. However, for brevity, the following embodiments take an electric vehicle as an example for description.

Figure 2:
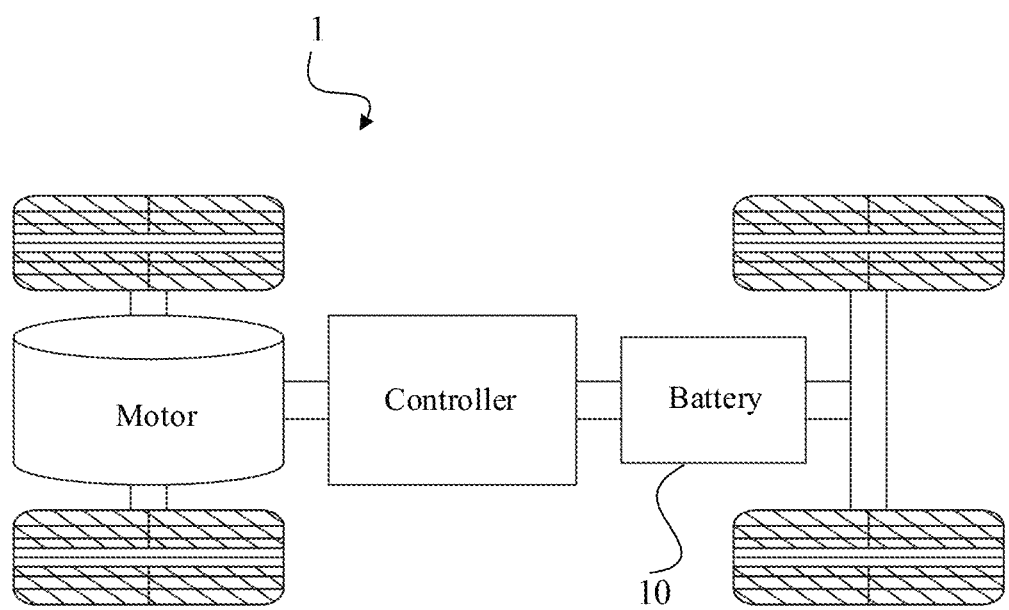
FIG. 2 is a schematic diagram of a vehicle according to an embodiment of the present application.

For example, FIG. 2 is a schematic structural diagram of a vehicle 1 to which this embodiment of the present application may be applied. The vehicle 1 may be a fuel vehicle, a gas vehicle, or a new energy vehicle, and the new energy vehicle may be a battery electric vehicle, a hybrid electric vehicle, an extended-range vehicle, etc. A battery 10 may be provided inside the vehicle 1, for example, the battery 10 may be provided at the bottom or the head or the tail of the vehicle 1. The battery 10 may be configured to supply power to the vehicle 1. For example, the battery 10 can be used as an operation power supply of the vehicle 1, and is used for a circuitry of the vehicle 1, for example, for a working power demand of the vehicle 1 during startup, navigation, and running. The battery 10 can serve not only as an operation power supply of the vehicle 1, but also as a driving power supply of the vehicle 1, and replaces or partially replaces fuel or natural gas to provide driving power for the vehicle 1.

In order to satisfy different power demands, the battery may include a plurality of battery cells. The plurality of battery cells may be connected in series or in parallel or in a hybrid manner, and the hybrid connection means a mixture of the serial connection and the parallel connection. The battery may also be referred to as a battery pack. The plurality of battery cells may first be connected in series or in parallel or in a hybrid manner to form battery modules, and then a plurality of battery modules are connected in series or in parallel or in a hybrid manner to form a battery. That is, the plurality of battery cells may directly form a battery, or may first form battery modules, and the battery modules then form a battery.

Figure 3:
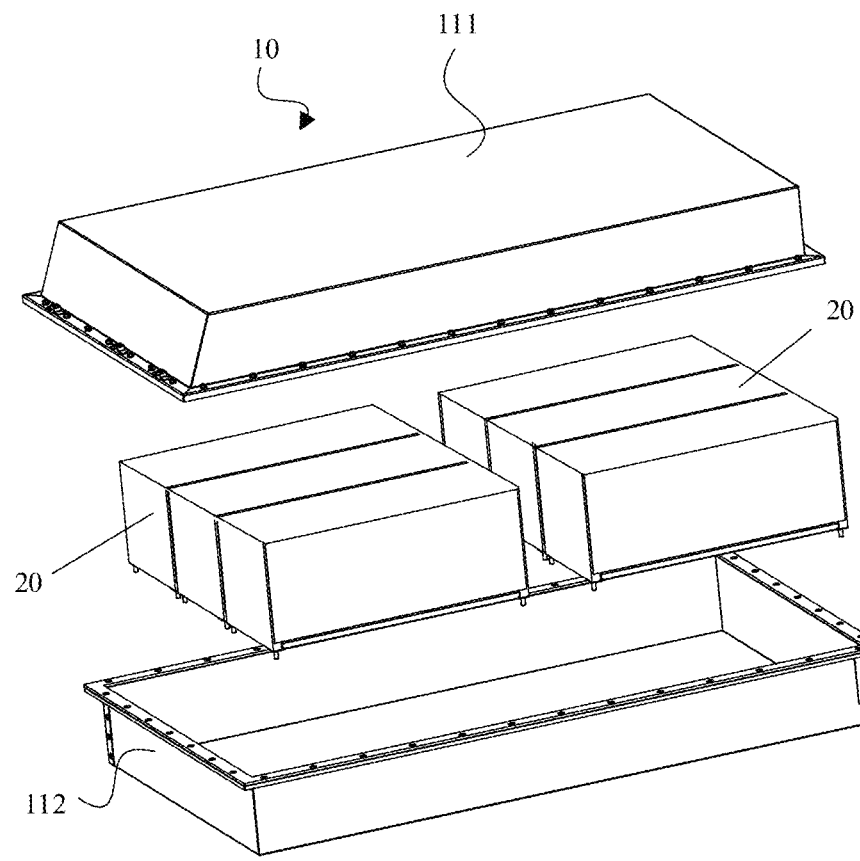
FIG. 3 is a schematic structural diagram of a battery according to an embodiment of the present application.

FIG. 3 is a schematic structural diagram of a possible battery according to an embodiment of the present application. As shown in FIG. 3, the battery 10 may include a plurality of battery cells 20. The battery 10 may also include a covering or a case, the interior of the covering is of a hollow structure, and the plurality of battery cells 20 are contained in the covering. As shown in FIG. 3, the covering may include 111 and 112 snapped together.

The battery 10 may also include other structures, which will not be described herein one by one. For example, the battery 10 may further include a bus component configured to implement electrical connections between the plurality of battery cells 20, which are connected, for example, in parallel or in series or in a hybrid manner. Specifically, the bus component may implement electrical connections between the battery cells 20 by connecting the electrode terminals of the battery cells 20. Further, the bus component may be fixed to the electrode terminals of the battery cells 20 through welding. The electric energy of the plurality of battery cells 20 may be further drawn through the covering by means of a conductive mechanism. For example, the conductive mechanism may also belong to the bus component.

Figure 4:
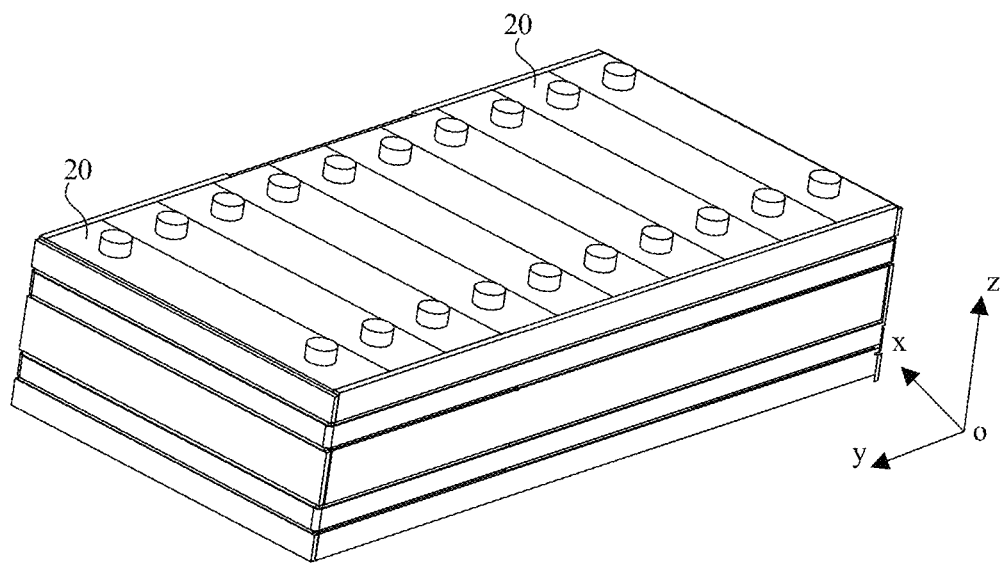
FIG. 4 is a schematic structural diagram of a battery module according to an embodiment of the present application.

The number of the battery cells 20 may be set to any value depending on different power demands. The plurality of battery cells 20 may be connected in series, in parallel, or in a hybrid manner to achieve a greater capacity or power. Since the number of battery cells 20 included in each battery 10 may be large, for ease of installation, the battery cells 20 may be arranged in groups, with each group of battery cells 20 forming a battery module. For example, as shown in FIG. 4, the battery may include a plurality of battery modules, which may be connected in series, in parallel, or in a hybrid manner.

The materials and shapes of the battery cells are not limited in the embodiments of the present application. For example, the battery cell 20 may be a lithium-ion secondary battery, a lithium-ion primary battery, a lithium-sulfur battery, a sodium lithium-ion battery, a sodium-ion battery, a magnesium-ion battery, etc. For another example, the battery cell 20 may be in a shape of a cylinder, a flat body, or a cuboid, or in another shape.

Figure 5:
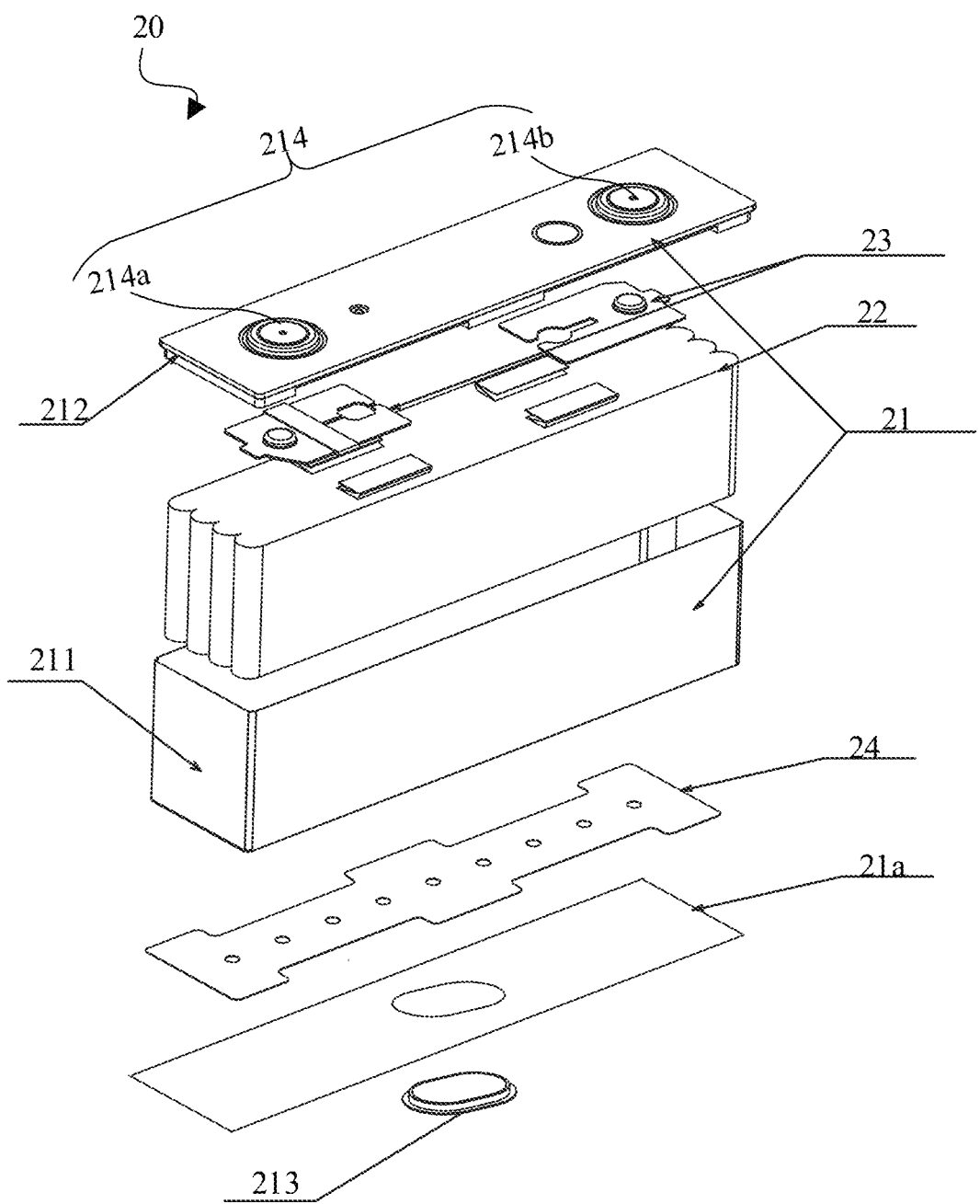
FIG. 5 is an exploded view of a battery cell according to an embodiment of the present application.

FIG. 5 is a schematic structural diagram of a possible battery cell 20 according to an embodiment of the present application. As shown in FIG. 5, the battery cell 20 includes a housing 211, a cover plate 212, an electrode assembly 22, and a connecting member 23. A wall of the housing 211 and the cover plate 212 each are referred to as a wall of the battery cell 20. As shown in FIG. 5, a pressure relief mechanism 213 is provided on a wall 21a of the battery cell. For ease of illustration, the wall 21a is separated from the housing 211 in FIG. 5, but this does not impose a limitation that there is an opening on the bottom side of the housing 211. The pressure relief mechanism 213 is configured to release an internal pressure when the internal pressure of the battery cell 20 reaches a threshold.

The pressure relief mechanism 213 may be a part of the wall 21a, or may be in a split structure with the wall 21a, and fixed to the wall 21a through, for example, welding. When the pressure relief mechanism 213 is a part of the wall 21a, for example, the pressure relief mechanism 213 may be formed by providing an indentation on the wall 21a, and the thickness of the wall 21a corresponding to the indentation is less than the thicknesses of the regions of the pressure relief mechanism 213 other than the nick. The indentation is the weakest position of the pressure relief mechanism 213. When the gas generated by the battery cell 20 is too much to cause the internal pressure of the housing 211 to rise and reach the threshold, the pressure relief mechanism 213 can be fractured at the indentation to cause the communication of the housing 211 from the inside to the outside, and the pressure of the gas is released outward through the cracking of the pressure relief mechanism 213, thereby preventing the explosion of the battery cell 20.

As shown in FIG. 5, when the pressure relief mechanism 213 is provided on the wall 21a of the battery cell 20, an electrode terminal 214 is provided on the other wall of the battery cell 20. For example, the wall 21a may be the bottom wall of the battery cell 20, while the other wall may be the top wall of the battery cell 20, i.e., the cover plate 212.

The pressure relief mechanism 213 and the electrode terminal 214 are provided on different walls of the battery cell 20, such that the emissions of the battery cell 20 can be farther away from the electrode terminals 214, thereby reducing the impact of the emissions on the electrode terminals 214 and the bus component, and enhancing the safety of the battery.

Further, when the electrode terminal 214 is provided on the cover plate 212 of the battery cell 20, the pressure relief mechanism 213 is provided on the bottom wall of the battery cell 20, so that the emissions of the battery cell 20 can be discharged to the bottom of the battery cell 10. In this way, in one aspect, the danger from the emissions can be reduced by using a thermal management system or the like at the bottom of the battery 10; and in another aspect, the bottom of the battery 10 is usually far away from the user, so that the harm to the user can be reduced.

The pressure relief mechanism 213 may be of a variety of possible pressure relief structures, which is not limited in the embodiments of the present application. For example, the pressure relief mechanism 213 may be a temperature-sensitive pressure relief mechanism configured to melt when the internal temperature of the battery cell 20 provided with the pressure relief mechanism 213 reaches a threshold; and/or the pressure relief mechanism 213 may be a pressure-sensitive pressure relief mechanism configured to be capable of being fractured when the internal air pressure of the battery cell 20 provided with the pressure relief mechanism 213 reaches a threshold.

Figure 6:
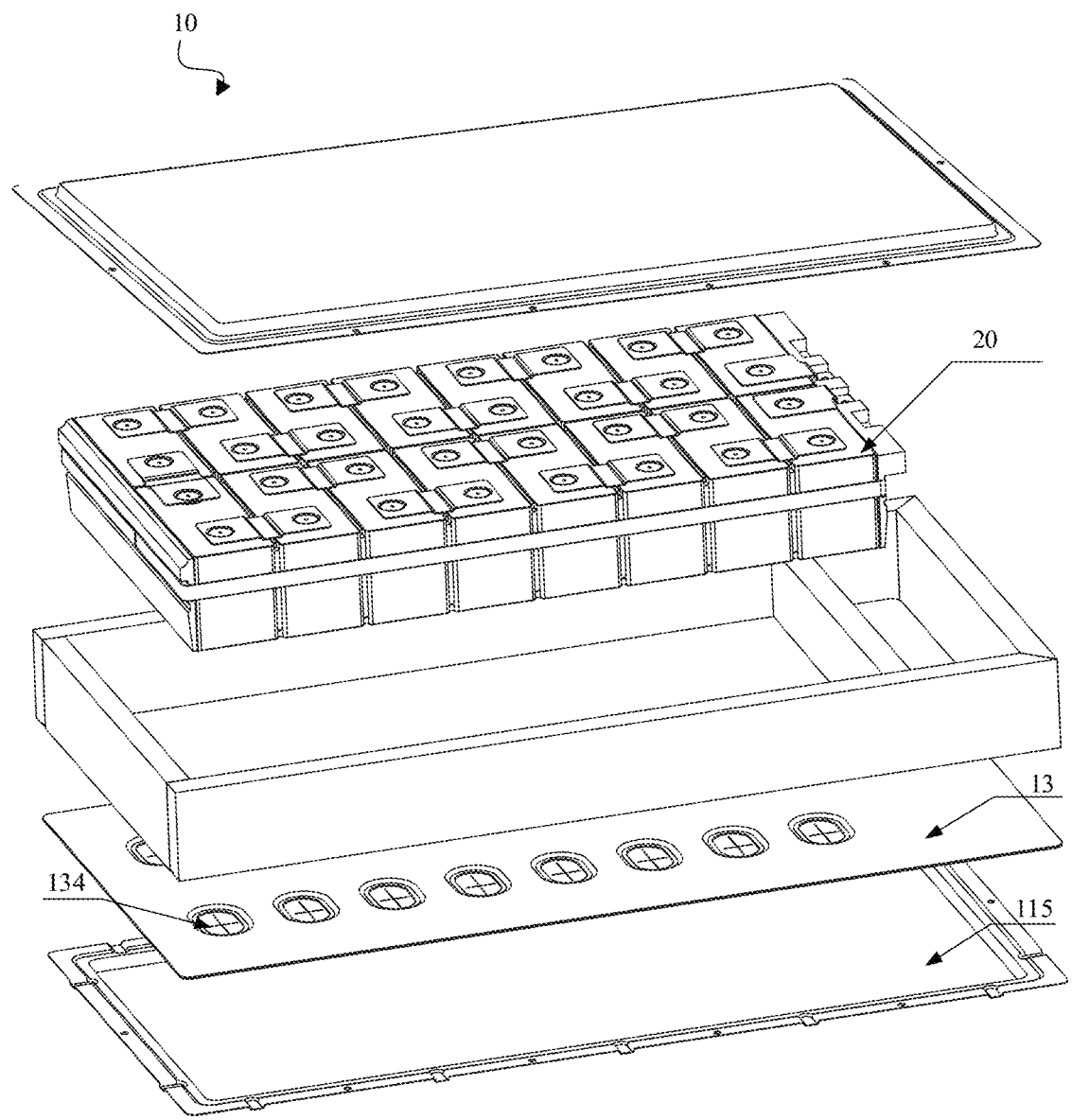
FIG. 6 is an exploded view of a battery according to an embodiment of the present application.

For example, in the exploded view of the battery 10 shown in FIG. 6, the battery 10 includes a plurality of battery cells 20, and the components of the battery 10 may be described with reference to the foregoing embodiments. For brevity, details are not described herein again. As shown in FIG. 6, the heat conducting apparatus 13 is provided with a recess 134 arranged opposite to the pressure relief mechanism 213, and the bottom wall of the recess 134 is weaker than other regions of the heat conducting apparatus 13, and is easily damaged by emissions. Therefore, the emissions can damage the bottom wall of the recess 134, so that the cooling medium in the heat conducting apparatus 13 is discharged from the inside of the heat conducting apparatus 13. The opening of the recess 134 may face the wall 21a. The opening of the recess 134 may also back onto the wall 21a, in which case the bottom wall of the recess 134 is also easily damaged by the emissions. The heat conducting apparatus 13 may be made of a heat conducting material to form a flow channel of the cooling medium. The cooling medium flows in the flow channel and conducts heat by means of the heat conducting material to cool the battery cell 20.

Based on the cooperation between the pressure relief mechanism 213 and the heat conducting apparatus 13, a thermal runaway detection method according to an embodiment of the present application is described below, wherein for parts not described in detail, reference is made to the foregoing embodiments.

Figure 7:
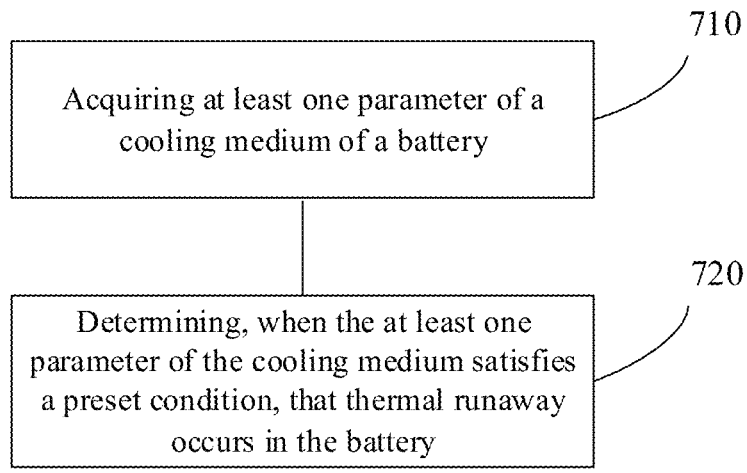
FIG. 7 is a schematic flowchart of a thermal runaway detection method according to an embodiment of the present application.

FIG. 7 is a schematic flowchart of a thermal runaway detection method according to an embodiment of the present application. As shown in FIG. 7, the thermal runaway detection method 700 includes:

Step 710: acquiring at least one parameter of a cooling medium of a battery.

Step 720: determining, when the at least one parameter of the cooling medium satisfies a preset condition, that thermal runaway occurs in the battery.

When thermal runaway occurs in the battery, this may cause the heat conducting apparatus in the battery to be damaged, and thus causes the parameters of the cooling medium contained in the heat conducting apparatus to change. Therefore, occurrence of thermal runaway of the battery may be effectively detected according to the parameters of the cooling medium.

Further, when it is determined in step 720 that thermal runaway occurs in the battery, an indication signal for indicating that thermal runaway occurs in the battery may be output to a VCU.

Figure 8:
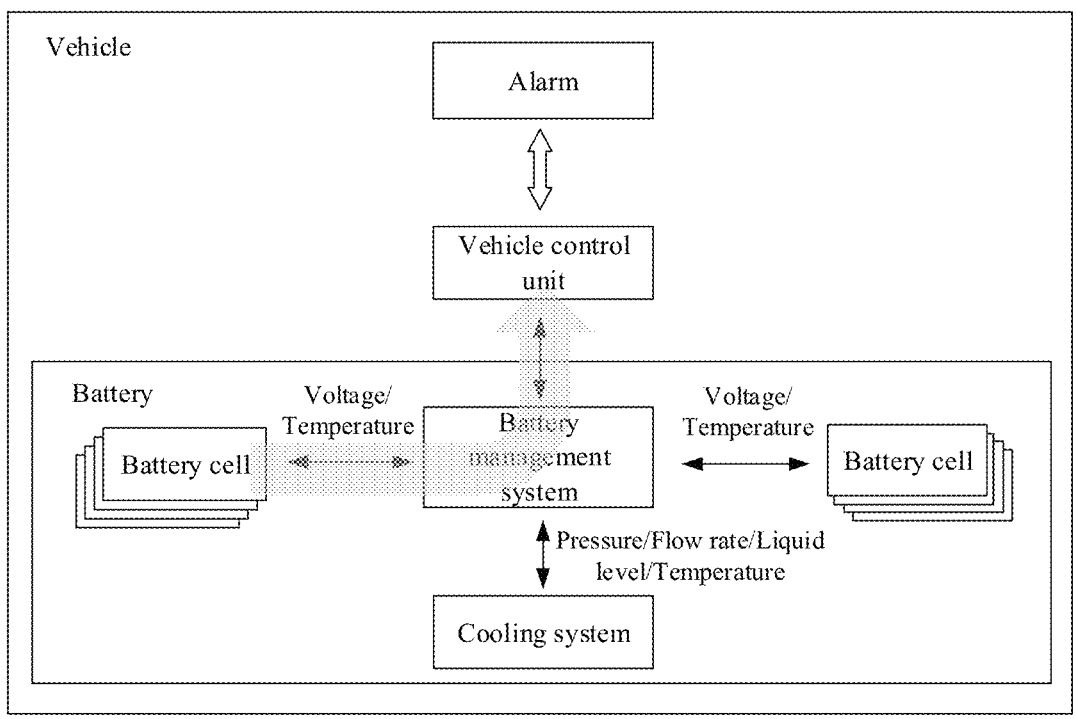
FIG. 8 is a schematic block diagram of monitoring a thermal runaway by a BMS based on the method shown in FIG. 7.

The method 700 shown in FIG. 7 may be performed by a BMS. For example, as shown in FIG. 8, the BMS is responsible for acquiring at least one parameter of the cooling medium from a thermal management system, and determining, when the at least one parameter of the cooling medium satisfies a preset condition, that thermal runaway occurs in the battery. When determining that thermal runaway occurs in the battery, the BMS outputs, to the VCU, an indication signal for indicating that thermal runaway occurs in the battery. The VCU issues an alarm signal after receiving the indication signal. The alarm signal may be, for example, a sound signal or an optical signal.

In the embodiments of the present application, a thermal management system, such as a cooling system, is used to thermal management of the battery. In a possible implementation manner, the thermal management system includes: the heat conducting apparatus including components such as a cooling plate or a liquid cooling plate, a storage box, an electronic water pump, a cooler, and a sensor.

The heat conducting apparatus may be a heat-dissipating pipe surrounding the battery, that is, a flow channel, and cooperates with the pressure relief mechanism on the battery cell. When thermal runaway occurs in the battery cell, the pressure relief mechanism on the battery cell can release the internal pressure and instantaneously (typically less than 1 second) fracture the heat conducting apparatus, thereby allowing the cooling medium in the heat conducting apparatus to flow out of the inside. The storage box communicates with the heat conducting apparatus and is configured to store the cooling medium. The electronic water pump is configured to adjust the pushing pressure of the pump through electric driving, to adjust the flow speed of the cooling medium in the heat conducting apparatus and the like. In the cooler, the refrigerant in an air conditioning system is used for absorbing the heat of the cooling medium in the heat conducting apparatus to achieve the purposes of heat dissipation and cooling.

In this embodiment, the at least one parameter of the cooling medium may, for example, include at least one of the following parameters: pressure of the cooling medium, a flow rate of the cooling medium, a liquid level of the cooling medium, and temperature of the cooling medium.

When the heat conducting apparatus is damaged due to the thermal runaway of the battery cell, the cooling medium in the heat conducting apparatus flows out of the damaged part of the heat conducting apparatus due to gravity, and the liquid level of the cooling medium stored in the storage box is significantly reduced or even reaches 0; the flow rate of the cooling medium also decreases due to the loss of the cooling medium; the pressure of the cooling medium also decreases, for example, from the pressure generated thereon by the water pump to the pressure generated due to gravity; and the heat generated when thermal runaway occurs in the battery cell is absorbed by the cooling medium, so that the temperature of the cooling medium is increased.

Figure 9:
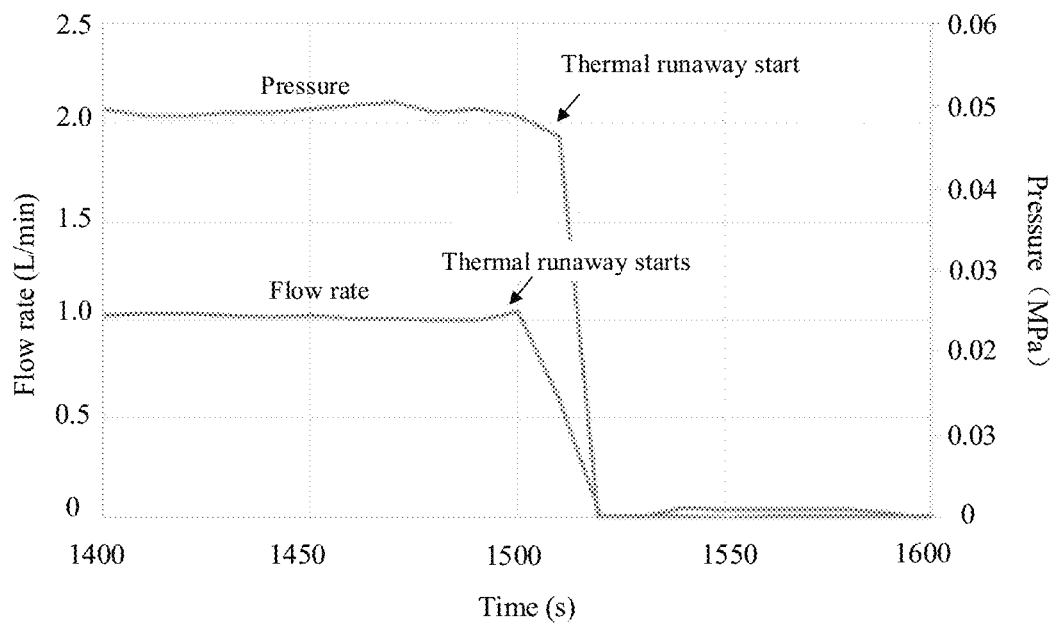
FIG. 9 is a schematic diagram of changes in a pressure and flow rate of a cooling medium when thermal runaway occurs in a battery.

The changes in the parameters of the cooling medium, especially the pressure, the flow rate, and the liquid level of the cooling medium, are relatively sensitive to the heat conducting apparatus being damaged. Therefore, the thermal runaway of the battery can be accurately detected by using the parameters of the cooling medium. For example, as shown in FIG. 9, when thermal runaway occurs in the battery, the pressure and the flow rate of the cooling medium decrease sharply, the pressure decreases from about 0.05 MPa to 0 MPa, and the flow decreases from about 1 L/min to 0 L/min.

In step 720, the at least one parameter of the cooling medium satisfying a preset condition may, for example, include: the at least one parameter of the cooling medium satisfying any one of the following preset conditions: a parameter value reaching a corresponding threshold; a change amount of the parameter value reaching a corresponding threshold; and the parameter value being lost.

In this embodiment, a parameter value of the cooling medium reaching a certain threshold, the change amount of the parameter value reaching a certain threshold, or the parameter value being lost may be used as a condition for determining occurrence of thermal runaway.

For example, the pressure of the cooling medium satisfying a preset condition includes: the pressure of the cooling medium dropping to a first pressure threshold; a change amount of the pressure of the cooling medium exceeding a second pressure threshold; or data of the pressure of the cooling medium being lost.

There is a case where the cooling medium may accumulate transiently at the damaged part of the heat conducting apparatus when thermal runaway occurs in the battery, thereby causing the pressure of the cooling medium to increase instantaneously, but then gradually decrease to 0. However, such a change can still be detected by the pressure sensor, and when the change amount of the pressure of the cooling medium detected by the pressure sensor exceeds the second pressure threshold, or the detected pressure of the cooling medium decreases to the first pressure threshold, it can be determined that thermal runaway occurs in the battery.

For another example, the flow rate of the cooling medium satisfying a preset condition includes: the flow rate of the cooling medium dropping to a first flow threshold; a change amount of the flow rate of the cooling medium exceeding a second flow threshold; or data of the flow rate of the cooling medium being lost.

For another example, the liquid level of the cooling medium satisfying a preset condition includes: the liquid level of the cooling medium dropping to a first level threshold; a change amount of the liquid level of the cooling medium exceeding a second level threshold; or data of the liquid level of the cooling medium being lost.

For another example, the temperature of the cooling medium at an output port of the heat conducting apparatus satisfying a preset condition includes: the temperature of the cooling medium rising to a first temperature threshold; a change amount of the temperature of the cooling medium exceeding a second temperature threshold; or data of the temperature of the cooling medium being lost.

It can be learned that by comparing the value of the parameter of the cooling medium and/or the change amount of the parameter with a corresponding threshold, it may be convenient to determine whether thermal runaway occurs in the battery. In practical applications, based on the change rule, the change speed, etc. of different parameters, suitable conditions can be used to determine whether thermal runaway occurs in the battery.

In addition, when the heat conducting apparatus is damaged to cause the cooling medium to flow out of the inside of the heat conducting apparatus, the sensor for monitoring the parameter may be damaged, and thus the parameter value may be lost. Therefore, when the parameter value of this parameter is lost, for example, the pressure, the liquid level, and the flow rate of the cooling medium suddenly become 0, it may also be considered that thermal runaway occurs in the battery.

It should be understood that in the monitoring of the change amount of the parameter of the cooling medium, it may be determined that thermal runaway occurs in the battery, when it is determined that the change amount of the parameter cumulatively reaches a corresponding threshold, for example, when the rise amount or the drop amount of the parameter reaches a corresponding threshold; and it may be determined that thermal runaway occurs in the battery, when it is determined that the change amount of the parameter within preset duration reaches the corresponding threshold, for example, when the rise amount or the drop amount of the parameter within the preset duration reaches a corresponding threshold.

The above various parameters of the cooling medium may be used alone or in combination to improve the robustness of thermal runaway detection. For example, when the pressure of the cooling medium satisfies a corresponding preset condition and the liquid level of the cooling medium satisfies a corresponding preset condition, it is determined that thermal runaway occurs in the battery; for another example, when the pressure of the cooling medium satisfies a corresponding preset condition and the flow rate of the cooling medium satisfies a corresponding preset condition, it is determined that thermal runaway occurs in the battery; for another example, when the liquid level of the cooling medium satisfies a corresponding preset condition and the flow rate of the cooling medium satisfies a corresponding preset condition, it is determined that thermal runaway occurs in the battery; and for another example, when the pressure, the liquid level, and the flow rate of the cooling medium all meet respective preset conditions, it is determined that thermal runaway occurs in the battery.

Further, the above parameters of the cooling medium may also be used in combination with parameters such as the pressure and temperature of the battery cell. The BMS usually manages the battery by monitoring the pressure and temperature of the battery cell, and therefore, the pressure and temperature of the battery cell may also be taken into account when it is determined whether thermal runaway occurs in the battery according to the above parameters of the cooling medium. For example, when one or more of the above parameters of the cooling medium reach corresponding conditions, and the pressure and/or temperature of the battery cell reaches a corresponding condition, it is determined that thermal runaway occurs in the battery.

Parameters such as the pressure, the liquid level, the flow rate, and the temperature of the cooling medium may be monitored by sensors provided in the thermal management system. There is no need to install a sensor on each battery cell to detect whether thermal runaway occurs in the battery cell, so that the use of this solution does not add significant costs.

For example, in the method 700, the pressure of the cooling medium may be acquired from the pressure sensor. The pressure sensor is disposed on an input port or an output port of the heat conducting apparatus, and is configured to monitor the pressure of the cooling medium.

The input port and the output port of the heat conducting apparatus is configured to input and output the cooling medium, and the pressure sensor is disposed on the input port or the output port of the heat conducting apparatus, which ensures the convenience of an installation position, and also makes it easier to monitor the change in the pressure of the cooling medium.

For another example, in the method 700, the flow rate of the cooling medium may be acquired from a flow rate sensor. The flow rate sensor is disposed on an input port or an output port of the heat conducting apparatus, and the flow rate sensor is configured to monitor the flow rate of the cooling medium.

The flow rate sensor is disposed on the input port or the output port of the heat conducting apparatus, which ensures the convenience of an installation position, and also makes it easier to monitor the change in the flow rate of the cooling medium.

For another example, in the method 700, the liquid level of the cooling medium may be acquired from a liquid level sensor. The liquid level sensor is disposed on a storage box configured to store the cooling medium, and the liquid level sensor is configured to monitor the liquid level of the cooling medium stored in the storage box.

The cooling medium is stored in the storage box, and the storage box communicates with the input port of the heat conducting apparatus. The change in the liquid level in the storage box is more sensitive than the liquid level in the heat conducting apparatus, to the case where the cooling medium in the heat conducting apparatus is discharged from the inside of the heat conducting apparatus because thermal runaway occurs in the battery, and thus the flow rate sensor is disposed on the storage box, so that the change in the liquid level of the cooling medium can be more accurately monitored, and it is easier to install the liquid level sensor on the storage box.

For another example, in the method 700, the temperature of the cooling medium may be acquired from the temperature sensor. The temperature sensor is disposed on an output port of the heat conducting apparatus, and the temperature sensor is configured to monitor the temperature of the cooling medium at the output port of the heat conducting apparatus.

The positions of the pressure sensor, the liquid level sensor, the flow rate sensor, and the temperature sensor described above are merely examples, and the installation positions of the sensors are not limited in the embodiments of the present application. In practical applications, the sensors may be provided at other positions.

Further, in the embodiments of the present application, one sensor may be provided, or a plurality of sensors may be provided to improve the accuracy of thermal runaway detection. For example, two pressure sensors may be provided at the input port and the output port of the heat conducting apparatus, respectively, and whether thermal runaway occurs in the battery is determined according to the value of the parameter output from at least one of the pressure sensors.

Figure 10:
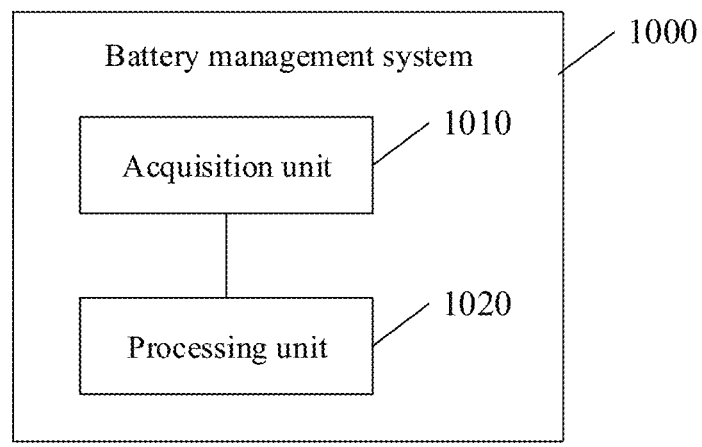
FIG. 10 is a schematic block diagram of a BMS according to an embodiment of the present application.

As shown in FIG. 10, an embodiment of the present application further provides a BMS, and the BMS 1000 is applied to a battery including a heat conducting apparatus. A cooling medium is contained in the heat conducting apparatus, and the cooling medium may be used to cool the battery. It should be understood that when thermal runaway occurs in the battery, the heat conducting apparatus can be damaged, and thus the cooling medium in the heat conducting apparatus is discharged from the inside of the heat conducting apparatus.

As shown in FIG. 10, the BMS 1000 includes:
an acquisition unit 1010 configured to acquire at least one parameter of the cooling medium; and a processing unit 1020 configured to determine, when the at least one parameter satisfies a preset condition, that thermal runaway occurs in the battery.

When thermal runaway occurs in the battery, this may cause the heat conducting apparatus in the battery to be damaged, and thus causes the parameters of the cooling medium contained in the heat conducting apparatus to change. Therefore, occurrence of thermal runaway of the battery may be effectively detected according to the parameters of the cooling medium.

In a possible implementation manner, the at least one parameter acquired by the acquisition unit includes at least one of the following parameters: pressure of the cooling medium, a flow rate of the cooling medium, a liquid level of the cooling medium, and temperature of the cooling medium.

In a possible implementation manner, the at least one parameter satisfying a preset condition includes: the at least one parameter satisfying any one of the following preset conditions: a parameter value reaching a corresponding threshold; a change amount of the parameter value reaching a corresponding threshold; and the parameter value being lost.

In a possible implementation manner, the at least one parameter includes the pressure of the cooling medium, wherein the processing unit 1020 is specifically configured to: determine, when the pressure of the cooling medium drops to a first pressure threshold, a change amount of the pressure of the cooling medium exceeds a second pressure threshold, or data of the pressure of the cooling medium is lost, that thermal runaway occurs in the battery.

In a possible implementation manner, the acquisition unit is further configured to: acquire the pressure of the cooling medium from a pressure sensor, wherein the pressure sensor is disposed on an input port or an output port of the heat conducting apparatus, and the pressure sensor is configured to monitor the pressure of the cooling medium.

In a possible implementation manner, the at least one parameter includes the flow rate of the cooling medium, wherein the processing unit 1020 is specifically configured to: determine, when the flow rate of the cooling medium drops to a first flow threshold, a change amount of the flow rate of the cooling medium exceeds a second flow threshold, or data of the flow rate of the cooling medium is lost, that thermal runaway occurs in the battery.

In a possible implementation manner, the acquisition unit is further configured to: acquire the flow rate of the cooling medium from a flow rate sensor, wherein the flow rate sensor is disposed on an input port or an output port of the heat conducting apparatus, and the flow rate sensor is configured to monitor the flow rate of the cooling medium.

In a possible implementation manner, the at least one parameter includes the liquid level of the cooling medium, wherein the processing unit 1020 is specifically configured to: determine, when the liquid level of the cooling medium drops to a first level threshold, a change amount of the liquid level of the cooling medium exceeds a second level threshold, or data of the liquid level of the cooling medium is lost, that thermal runaway occurs in the battery.

In a possible implementation manner, the acquisition unit is further configured to: acquire the liquid level of the cooling medium from a liquid level sensor, wherein the liquid level sensor is disposed on a storage box configured to store the cooling medium, and the liquid level sensor is configured to monitor the liquid level of the cooling medium stored in the storage box.

In a possible implementation manner, the at least one parameter includes the temperature of the cooling medium, wherein the processing unit 1020 is specifically configured to: determine, when the temperature of the cooling medium rises to a first temperature threshold, a change amount of the temperature of the cooling medium exceeds a second temperature threshold, or data of the temperature of the cooling medium is lost, that thermal runaway occurs in the battery.

In a possible implementation manner, the acquisition unit is further configured to: acquire the temperature of the cooling medium from a temperature sensor, wherein the temperature sensor is disposed on an output port of the heat conducting apparatus, and the temperature sensor is configured to monitor the temperature of the cooling medium at the output port of the heat conducting apparatus.

In a possible implementation manner, the processing unit 1020 is further configured to: output, to a vehicle control unit, an indication signal for indicating that thermal runaway occurs in the battery.

It should be understood that the specific manner of detecting a thermal runaway by the BMS 1000 and the beneficial effects generated may be described in the related descriptions in the method embodiments. For brevity, details are not described again.

Figure 11:
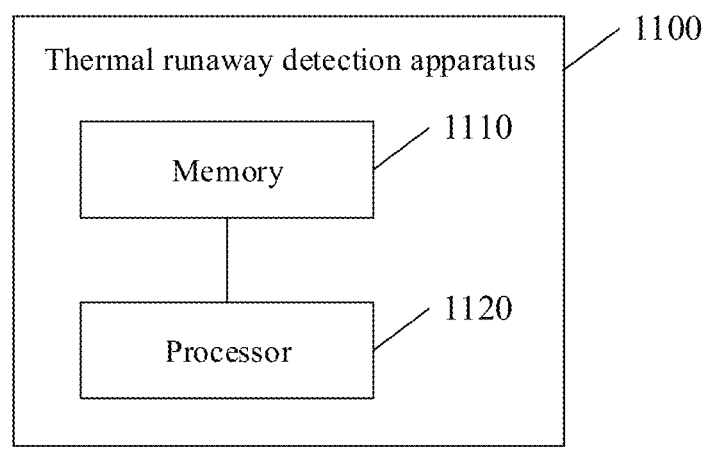
FIG. 11 is a schematic block diagram of a thermal runaway detection apparatus according to an embodiment of the present application.

As shown in FIG. 11, an embodiment of the present application further provides a thermal runaway detection apparatus 1100, which includes a memory 1110 and a processor 1120, wherein the memory 1110 is configured to store an instruction, and the processor 1120 is configured to read the instruction and perform the foregoing method based on the instruction.

An embodiment of the present application further provides a readable storage medium, wherein the readable storage medium is configured to store a computer program used to perform the foregoing method.

An embodiment of the present application further provides a battery including at least one battery cell and the battery management system BMS 500 shown in FIG. 5. The battery cell may be, for example, the battery cell 20 in the foregoing drawings.

An embodiment of the present application further provides a vehicle including a battery and a vehicle control system, wherein the vehicle control system is configured to receive an indication signal that is sent by the BMS in the battery for indicating that thermal runaway occurs in the battery. The vehicle may be, for example, the vehicle 1 in the foregoing drawings.

In a possible implementation, the vehicle control system is further configured to: issue an alarm signal according to the indication signal.

In a possible implementation, the alarm signal is an optical signal or a sound signal.

Unless otherwise defined, all technical and scientific terms used in the present application have the same meanings as commonly understood by those of ordinary skill in the art of the present application. Herein, the terms used in the description of the present application are merely for the purpose of describing specific embodiments, but are not intended to limit the present application. The terms "include" and "have" used in the specification, claims, and the above accompanying drawings of the present application or any variations of such terms are intended to cover a non-exclusive inclusion. It should be noted that the terms "first", "second" and the like in the specification and claims of the present application as well as the above accompanying drawings are used to distinguish different objects, and are not necessarily used to describe a specific order or a primary and secondary relation.

The phrase "embodiments" referred to in the present application means that the descriptions of specific features, structures, and characteristics in combination with the embodiments are included in at least one embodiment of the present application. The phrase at various locations in the specification does not necessarily refer to a same embodiment, or an independent or alternate embodiment exclusive of another embodiment. Those skilled in the art understand, in explicit and implicit manners, that an embodiment described in the present application may be combined with another embodiment.

The term "and/or" in the present application simply represents an association relationship that describes associated objects, and represents that three relationships may exist, for example, A and/or B may represent the following three cases: only A exists, both A and B exist, and only B exists. In addition, the character "/" in the present application usually indicates an "or" relationship between the associated objects.

As used in the present application, "a plurality of" means two or more (including two), similarly, "a plurality of groups" means two or more (including two) groups, and "a plurality of slices" means two or more (including two) slices.

The above embodiments are merely used for illustrating rather than limiting the technical solutions of the present application; although the present application is illustrated in detail with reference to the foregoing embodiments, those of ordinary skill in the art should understand that they can still make modifications to the technical solutions recorded in the foregoing embodiments or make equivalent replacements on some of the technical features thereof.

What is claimed is:

1. A thermal runaway detection method, applied to a battery, wherein the battery comprises a heat conducting apparatus, a cooling medium is contained in the heat conducting apparatus to cool the battery, a battery cell of the battery is provided with a pressure relief mechanism on a wall of the battery cell, a surface of the heat conducting apparatus is attached to the wall of the battery cell, the pressure relief mechanism is configured to release the internal pressure when the internal pressure of the battery cell reaches a threshold, so that the surface of the heat conducting apparatus is damaged, and the method comprises:
   acquiring at least one parameter of a cooling medium discharged from the heat conducting apparatus when the heat conducting apparatus is damaged, the battery comprising a heat conducting apparatus, and the cooling medium being contained in the heat conducting apparatus; and
   determining, when the at least one parameter satisfies a preset condition, that thermal runaway occurs in the battery.

2. The method according to claim 1, wherein the at least one parameter comprises at least one of the following parameters:
   pressure of the cooling medium, a flow rate of the cooling medium, a liquid level of the cooling medium, and temperature of the cooling medium.

3. The method according to claim 2, wherein the at least one parameter satisfying the preset condition comprises:
   the at least one parameter satisfying any one of the following preset conditions: a parameter value reaching a corresponding threshold; a change amount of the parameter value reaching a corresponding threshold; and the parameter value being lost.

4. The method according to claim 3, wherein the at least one parameter comprises the pressure of the cooling medium, wherein the pressure of the cooling medium satisfying a preset condition comprises:
   the pressure of the cooling medium dropping to a first pressure threshold; a change amount of the pressure of the cooling medium exceeding a second pressure threshold; or data of the pressure of the cooling medium being lost.

5. The method according to claim 4, further comprising:
   acquiring the pressure of the cooling medium from a pressure sensor, wherein the pressure sensor is disposed on an input port or an output port of the heat conducting apparatus, and the pressure sensor is configured to monitor the pressure of the cooling medium.

6. The method according to claim 3, wherein the at least one parameter comprises the flow rate of the cooling medium, wherein the flow rate of the cooling medium satisfying a preset condition comprises:
   the flow rate of the cooling medium dropping to a first flow threshold; a change amount of the flow rate of the cooling medium exceeding a second flow threshold; or data of the flow rate of the cooling medium being lost.

7. The method according to claim 6, further comprising:
   acquiring the flow rate of the cooling medium from a flow rate sensor, wherein the flow rate sensor is disposed on an input port or an output port of the heat conducting apparatus, and the flow rate sensor is configured to monitor the flow rate of the cooling medium.

8. The method according to claim 3, wherein the at least one parameter comprises the liquid level of the cooling medium, wherein the liquid level of the cooling medium satisfying a preset condition comprises:
   the liquid level of the cooling medium dropping to a first level threshold; a change amount of the liquid level of the cooling medium exceeding a second level threshold; or data of the liquid level of the cooling medium being lost.

9. The method according to claim 8, further comprising:
   acquiring the liquid level of the cooling medium from a liquid level sensor, wherein the liquid level sensor is disposed on a storage box configured to store the cooling medium, and the liquid level sensor is configured to monitor the liquid level of the cooling medium stored in the storage box.

10. The method according to claim 3, wherein the at least one parameter comprises the temperature of the cooling medium, wherein the temperature of the cooling medium satisfying a preset condition comprises:
    the temperature of the cooling medium rising to a first temperature threshold; a change amount of the temperature of the cooling medium exceeding a second temperature threshold; or data of the temperature of the cooling medium being lost.

11. The method according to claim 10, further comprising:
    acquiring the temperature of the cooling medium from a temperature sensor, wherein the temperature sensor is disposed on an output port of the heat conducting apparatus, and the temperature sensor is configured to monitor the temperature of the cooling medium at the output port of the heat conducting apparatus.

12. The method according to claim 1, further comprising:
outputting, to a vehicle control unit, an indication signal for indicating that thermal runaway occurs in the battery.

13. A battery management system of a battery, wherein the battery comprises a heat conducting apparatus, a cooling medium is contained in the heat conducting apparatus to cool the battery, a battery cell of the battery is provided with a pressure relief mechanism on a wall of the battery cell, a surface of the heat conducting apparatus is attached to the wall of the battery cell, the pressure relief mechanism is configured to release the internal pressure when the internal pressure of the battery cell reaches a threshold, so that the surface of the heat conducting apparatus is damaged, the battery management system comprises a memory and a processor, the memory is configured to store an instruction, and the processor is configured to read the instruction and perform, based on the instruction, the following method:
acquire at least one parameter of a cooling medium discharged from the heat conducting apparatus when the heat conducting apparatus is damaged, the battery comprising a heat conducting apparatus, and the cooling medium being contained in the heat conducting apparatus; and
determine, when the at least one parameter satisfies a preset condition, that thermal runaway occurs in the battery.

14. The battery management system according to claim 13, wherein the at least one parameter acquired comprises at least one of the following parameters:
pressure of the cooling medium, a flow rate of the cooling medium, a liquid level of the cooling medium, and temperature of the cooling medium.

15. The battery management system according to claim 14, wherein the at least one parameter satisfying the preset condition comprises:
the at least one parameter satisfying any one of the following preset conditions: a parameter value reaching a corresponding threshold; a change amount of the parameter value reaching a corresponding threshold; and the parameter value being lost.

16. The battery management system according to claim 15, wherein the at least one parameter comprises the pressure of the cooling medium, wherein the processor is specifically configured to:
acquire the pressure of the cooling medium from a pressure sensor, wherein the pressure sensor is disposed on an input port or an output port of the heat conducting apparatus, and the pressure sensor is configured to monitor the pressure of the cooling medium;
determine, when the pressure of the cooling medium drops to a first pressure threshold, a change amount of the pressure of the cooling medium exceeds a second pressure threshold, or data of the pressure of the cooling medium is lost, that thermal runaway occurs in the battery.

17. The battery management system according to claim 15, wherein the at least one parameter comprises the flow rate of the cooling medium, wherein the processor is specifically configured to:
acquire the flow rate of the cooling medium from a flow rate sensor, wherein the flow rate sensor is disposed on an input port or an output port of the heat conducting apparatus, and the flow rate sensor is configured to monitor the flow rate of the cooling medium; and
determine, when the flow rate of the cooling medium drops to a first flow threshold, a change amount of the flow rate of the cooling medium exceeds a second flow threshold, or data of the flow rate of the cooling medium is lost, that thermal runaway occurs in the battery.

18. The battery management system according to claim 15, wherein the at least one parameter comprises the liquid level of the cooling medium, wherein the processor is specifically configured to:
acquire the liquid level of the cooling medium from a liquid level sensor, wherein the liquid level sensor is disposed on a storage box configured to store the cooling medium, and the liquid level sensor is configured to monitor the liquid level of the cooling medium stored in the storage box; and
determine, when the liquid level of the cooling medium drops to a first level threshold, a change amount of the liquid level of the cooling medium exceeds a second level threshold, or data of the liquid level of the cooling medium is lost, that thermal runaway occurs in the battery.

19. The battery management system according to claim 15, wherein the at least one parameter comprises the temperature of the cooling medium, wherein the processor is specifically configured to:
acquire the temperature of the cooling medium from a temperature sensor, wherein the temperature sensor is disposed on an output port of the heat conducting apparatus, and the temperature sensor is configured to monitor the temperature of the cooling medium at the output port of the heat conducting apparatus; and
determine, when the temperature of the cooling medium rises to a first temperature threshold, a change amount of the temperature of the cooling medium exceeds a second temperature threshold, or data of the temperature of the cooling medium is lost, that thermal runaway occurs in the battery.

20. A battery, wherein the battery comprises a heat conducting apparatus, a cooling medium is contained in the heat conducting apparatus to cool the battery, and the battery further comprises:
at least one battery cell, wherein the battery cell is provided with a pressure relief mechanism on a wall of the battery cell, a surface of the heat conducting apparatus is attached to the wall of the battery cell, the pressure relief mechanism is configured to release the internal pressure when the internal pressure of the battery cell reaches a threshold, so that the surface of the heat conducting apparatus is damaged; and
a battery management system comprising a memory and a processor, wherein the memory is configured to store an instruction, and the processor is configured to read the instruction and perform, based on the instruction, the following method:
acquire at least one parameter of a cooling medium discharged from the heat conducting apparatus when the heat conducting apparatus is damaged, the battery comprising a heat conducting apparatus, and the cooling medium being contained in the heat conducting apparatus; and
determine, when the at least one parameter satisfies a preset condition, that thermal runaway occurs in the battery.

* * * * *